No. 892,051. PATENTED JUNE 30, 1908.
E. R. HEWITT.
VEHICLE.
APPLICATION FILED OCT. 1, 1906.

Witnesses
Inventor
Edward R. Hewitt
By his Attorneys

UNITED STATES PATENT OFFICE.

EDWARD R. HEWITT, OF NEW YORK, N. Y.

VEHICLE.

No. 892,051.        Specification of Letters Patent.        Patented June 30, 1908.

Application filed October 1, 1906. Serial No. 336,855.

*To all whom it may concern:*

Be it known that I, EDWARD R. HEWITT, a citizen of the United States, residing at the city of New York, in the county of New York and State of New York, have invented certain new and useful Improvements in Vehicles, of which the following is a full, clear, and exact description.

My invention relates to a means for resiliently supporting the body of a vehicle from the axle-bars, in place of the leaf or carriage springs commonly employed.

In the ordinary construction of road vehicles, there is a direct spring connection between the axle-bars and the body, which is required to yield to the full extent of motion of the wheels in use. This arrangement transmits a considerable percentage of the vibration to the vehicle body because the full amount of pressure exerted on the spring by the wheels on going over an obstacle is given to the frame of the vehicle and body. It is clear that if it were possible to reduce the amount of the motion due to this force the body and frame would more nearly remain in a parallel plane when the wheels go over an obstacle.

The object of the present invention is to reduce this motion by a lever having unequal arms on each side of the fulcrum. It has been proved by experiment that the amount of vertical motion imparted to the body when the wheels go over an obstacle is reduced by this device in proportion to the length of the lever arms on each side of the fulcrum to each other. In practical work it is easy to reduce the vibration to one-fifth or one-fourth of that sustained with the usual type of springs.

A further object is to avoid breaking the springs by shock or rebound. It is also found that the mechanical construction is such that springs may very readily be exchanged or made to carry greater loads by tightening the nuts, and increasing the tension.

With these and other objects in view the invention consists in the features of improvement hereinafter set forth and claimed.

Figure 1:
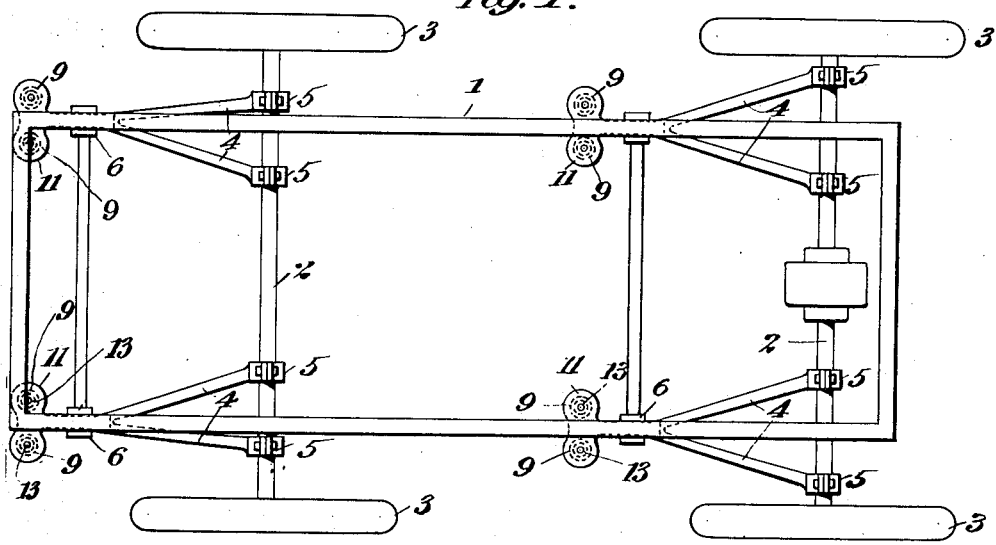
Figure 2:
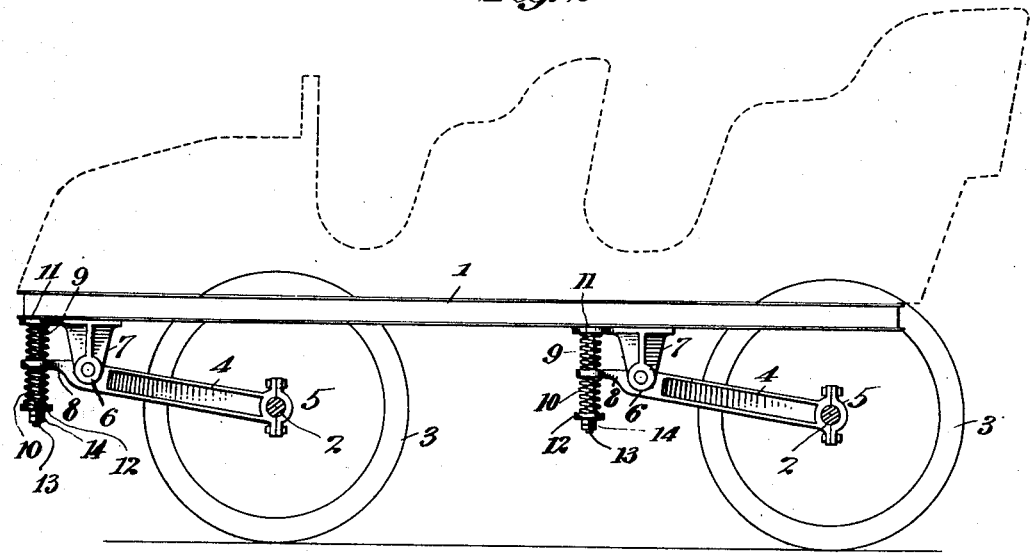

In the drawings, Figure 1 is plan view of a vehicle having the features of my invention embodied therein; Fig. 2 is a side view of the same, with two wheels removed.

When a motor vehicle is proceeding along an ordinary road, the wheels enter every depression therein and have a continuous and very irregular movement in a vertical direction. If the vehicle body and the axle-bars are directly connected by springs, it is unavoidable that a large amount of the wheel movement be transmitted to the vehicle body through the spring connection. In carrying out my invention I aim to overcome this defect by an intermediate lever between the axle-bar and the springs of the vehicle body, so that the wheels and the axle-bar can transmit only a fraction of their movement to the vehicle body.

Referring to the drawings in which like parts are designated by the same reference sign, 1 indicates the body or chassis of a vehicle, for example that of an ordinary motor car.

2 indicates axle-bars thereof, having the usual wheels 3, revoluble at the axle extremities in the ordinary way. In place of the usual spring connection between the vehicle body and the axle-bars I employ a special lever connection embodying the principles of my invention.

4 denote levers connected to the axle-bars at 5, and fulcrumed at 6 to extensions 7 of the vehicle body or chassis. The levers 4, may be the first or second order; that is to say they may be extended at 8, beyond the fulcrum 6, or they may terminate at the fulcrum point. I have illustrated the levers extended beyond the fulcrum point and having springs 9 and 10 bearing thereon. These springs serve to normally hold the levers 4 in a mid-position of their range of movement, so that the levers are capable of moving either up or down in the normal operation of the car. The spring 9 bears against an abutment 11, on the body or chassis 1, while the spring 10 shoulders against a washer 12 supported at the extremity of the bolt 13, by the nuts 14. The bolt 13 is conveniently arranged to depend from the body or chassis 1, through the springs 9 and 10 and through the lever extension 8 for this purpose.

The operation is as follows: As the vehicle proceeds along the roadway, the wheels and their axle-bars have an unavoidable vertical movement, which is at times of considerable amplitude. This movement is transmitted to the levers 4, which oscillate on the fulcrum 6 to accommodate it, but it is evident that the extensions 8 of the levers do not have as wide an arc of movement as the axle bars because of their less distance from the fulcrums 6. The lever vibrations are at once absorbed by one or another of the two springs 9 and 10, and the amount of vibration which is finally imparted to the vehicle body or chassis is reduced in proportion to the relation of the lever arms.

I regard the above construction as a very advantageous one from the standpoint of construction, and having the parts renewed. It is evident that the springs are small and one or two extra ones may be easily carried along on a trip in order to replace any that may be broken. A simple channel frame with parallel sides may be used in place of the rather costly irregularly shaped frames or chassis now in use.

What I claim, is:—

In combination with an automobile chassis having rigid side bars, rigid extensions depending therefrom at a pair of transversely opposite points, a rod joining the transversely opposite extensions, levers pivoted thereto and extending rearwardly with respect to the chassis said levers having short arms projecting forwardly and vertically perforated at their extremities, bolts depending rigidly from said chassis through said perforations, springs surrounding said bolts and engaging said arms of the levers on opposite sides, nuts and washers at the lower ends of the bolts serving to hold said springs adjustably in place, and an axle having wheels, at the extremities of the rearwardly extending portions of said levers.

In witness whereof, I subscribe my signature, in the presence of two witnesses.

EDWARD R. HEWITT.

Witnesses:
 JOHN F. LAW,
 J. M. A. FOLEY.